July 21, 1970 T. L. STUECK 3,521,182

ENCODING SYSTEM FOR DIGITAL LINKS

Filed April 29, 1968 4 Sheets-Sheet 1

INVENTOR.
TROY L. STUECK

INVENTOR.
TROY L. TUECK

ENCODING SYSTEM FOR DIGITAL LINKS

Filed April 29, 1968 4 Sheets-Sheet 3

INVENTOR
TROY L. STUECK

INVENTOR.
TOY L. STUECK

United States Patent Office 3,521,182
Patented July 21, 1970

3,521,182

ENCODING SYSTEM FOR DIGITAL LINKS

Troy L. Stueck, Baltimore County, Md.
(161 Stanmore Road, Baltimore, Md. 21212)

Continuation-in-part of application Ser. No. 517,186, Dec. 23, 1965. This application Apr. 29, 1968, Ser. No. 725,230
Int. Cl. H03b 3/04
U.S. Cl. 331—14 2 Claims

ABSTRACT OF THE DISCLOSURE

An electrical system having phase-synchronized servo and frequency synthesis means for the digital encoding of an input variable-frequency signal wherein a digital-controlled oscillator is caused to discreetly approximate the input signal in a phaselock loop. The electrical system input is frequency and the electrical system output is digital.

Figure 1:
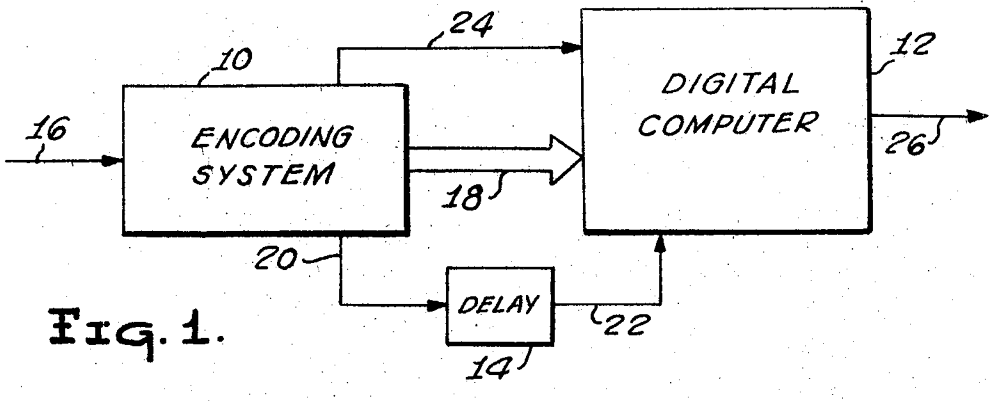

This invention pertains to means for encoding input variable frequency signals into a digital output format. More specifically, it pertains to the case in which said means has a machine-time response approaching a real-time conversion response, and said means is characterized by an incremental output signal representation.

In the field of digital computers, for example, it is frequently desired to accept encoded data points of an analog frequency variable such that the value of said encoded data points is obtained practically instantaneously. Prior art encoding systems require that the digital encoding process operate at some time slower than real-time, wherein the encoded data points represent the integral over some arbitrary time interval instead of providing said desired instantaneous encoding.

Thus, prior art encoding systems provide smoothed or averaged data points as a result of operating on the basis of encoding by time-interval digital counting. This method is well known in the art as an encoding means by which a digital counter is gated open for a duration of time so as to count each cycle of input frequency variable signal for said duration of time.

This prior art does not teach how to implement encoding means for real-time readout to digital links primarily because of its limitation to the application of open-loop digital counting means. In general, an encoding means is a device, which when fed with an input variable frequency, as in this case, generates an output digital representation of that input frequency. The encoding process need not be limited to known open-loop means but can be accomplished also by servo means, as in the present invention.

This present specification is a continuation-in-part of my copending application No. 517,186, Digital Phaselock System, filed Dec. 23, 1965, now abandoned. In my copending application, a system means for real-time encoding is delineated in basic form. The purpose of the present invention is to show means for coupling a real-time encoding system in digital data links and the synchronization thereof.

If a frequency variable signal F is approximated by a discreet or incremental approximation, the errors of approximation have two sources—static and dynamic operation. In static operation with the frequency output signal being non-variable, the error of approximation is the result of the smallest increment of resolution DF of the approximating frequency variable output signal N$x$DF. In other words, if an incrementally controlled oscillator output signal N$x$DF is used to approximate another frequency signal F, the approximation error $E_f$ in Hz. is simply $$E_f=|F-(NxDF|$$

where $E_f$ is the amount of error frequency in Hz., F is the frequency of Hz. of the signal being approximated, and (N$x$DF) is the generated approximate frequency in Hz. such that DF is the incremental resolution of said approximating generator in Hz. and N is an arbitrary multiple integer by which said generator is digitally controlled. It is appreciated that as the resolution DF of said generaor is incrementally reduced in value, the maximum amount of frequency error $E_f$ tends to approach zero error.

It is known in the present state of the art that digitally controlled oscillators (DCO) which employ frequency synthesis means can be reliably designed to provide incremental frequency changes DF of less than 0.01 Hz. per step so that it is possible to approximate a frequency F with an error $E_f$ of approximation being less than 0.01 Hz. to an accuracy of better than 0.001 Hz. in the radio frequency portion of the spectrum.

Even though the error frequency $E_f$ of the static opperation of said digitally controlled oscillator makes possible a means of close frequency approximation, other sources of apparent error frequency are present when said DCO is caused to operate dynamically whereby its output frequecy N$x$DF is varied incrementally as some arbitrary function of time. This variation is accomplished by making the control integer N at the input of said DCO a variable $n(t)$.

If the frequency being approximated F is varying as some function of time $f(t)$ and said DCO is to provide a frequency variable output signal N$x$DF which approximates F by making a N a variable as some function of time $n(t)$ whereby $$|(n(t)xDF)-f(t)|=E_f$$

it can then be seen that analytically describing the instantaneous error frequency $E_f$ between $f(t)$ and $(n(t)x\text{DF})$, the $E_f$ remains unaffected by the dynamic operation; however, this result assumes no transients, frequency shifts, or phase jumps at the DCO output as $n(t)x$DF is discreetly caused to approximate $f(t)$.

Some prior art DCO's exhibit output signals with negligible amplitude transients and frequency shifts that correspond to the dyanmically changing input control signals; however; those that operate on frequency synthesis means do exhibit phase discontinuities or phase jumps in their output signal. A phase jump has the same apparent effect to electronic measuring equipment as a frequency shift with the result of an apparently much higher error frequency $E_f$ than is actually the case.

If a function $f(t)$ is approximated by a piecewise approximation $n(t)x$DF, the phase discontinuities are particularly pronounced at the transitions from one discreet frequency N$x$DF to another $(N+1)xDF$.

The source of these phase discontinuities is a result of the design limitations present in the prior art of frequency synthesis methods. A direct frequency synthesizer derives its output signal by means of heterodyne and arithmetic operations on ten comb-generator frequencies which in turn have been derived from a single standard frequency source such as a crystal-controlled oscillator. The present method of derivation provides ten comb-generator frequencies (TCGF) which are pseudo-randomly related in phase. Since the TCGF have a random phase relation to each other, the dynamic output frequency signal $(N+1)xDF$ will relate said random phase characteristics in the form of undesired discreet phase jumps.

In order to permit the DCO to provide a signal $n(t)x$DF that can discreetly approximate a frequency signal $f(t)$ with a minimum error frequency $E_f$, provision must be made such that the output signal $n(t)x$DF is phase continuous in operation.

The method of this invention is to synchronize internal to the DCO the phase relationship of the TCGF so that they are periodically phase equal. If, then, a pulse P is generated during this period of phase equality, the method of approximation of $f(t)$, with $n(t)x$DF can be synchronized so that $n(t)x$DF can only change during the time interval of this phase-equality pulse P.

One example of a method of synchronizing phase equality in the TCGF is to generate an harmonic-rich pulse P train which is derived from the standard frequency source internal to the DCO either by digital dividers or other means so that said pulse train can be used to ring a set of contiguous filters, each of which can have a phase adjusting means at their respective outputs which permits the calibration of the TCGF to have a period of phase equality during the presence of each pulse P.

Since the pulses P are timed to occur during phase equality, they can be employed to gate the control signal $n(t)$ to change the frequency setting of the DCO so as to provide a phase-continuous output signal frequency as it is caused to piecewise approximate the variable frequency signal $f(t)$. The manner of gating said pulse P could be in conjunction with clock means of the electronic control circuitry which is input to the DCO.

If a DCO output signal can be made to piecewise-linear approximate a frequency variable signal $f(t)$, it can also be caused to track said signal $f(t)$ by closed-loop servo means such as in a digital phaselock system comprising at least a DCO, a forward-reverse digital counter, a counter clock, and a phase detector appropriately connected.

By connecting the output of the DCO $n(t)x$DF to one of the inputs of a phase detector with the other input connected to the variable frequency source $f(t)$ thereby producing a phase error signal that can be coupled to the forward-reverse gate of the digital counter so that a clock-source of pulses, synchronized with the phase-equality pulses P of said DCO, can be used to advance or subtract the count of said counter which provides the control signal $n(t)$ to said DCO, a means of using synchronized servo or closed-loop methods is developed for encoding variable frequency signals $f(t)$ in real-time.

It is to be appreciated that the encoding rate or tracking rate of said synchronized servo methods is limited to the pulse rate frequency PRF of the synch pulses P and the bandwidth BW of the closed-loop system design. The maximum BW that a particular servo system design could have is a function of the synchronizing pulse rate frequency PRF and the incremental resolution DF of said DCO such that $$BW_{\max}=(PRF)\times(DF)$$

The maximum BW of a specific servo system design effectively limits the rate of change in Hz. per unit time of the input frequency $f(t)$ that said system can track as in a phaselock loop system.

Consider the utility of the present encoding means as applied to the radio frequency portion of the spectrum wherein some coupling means is provided at the input and output of said encoding system. One apparent application is, of course, the digital detection of frequency modulations on any arbitrary radio frequency carrier signal in conjunction with the operation of digital computers. The present encoding means provides a method of precise digital detection of $f(t)$, and the digital computer provides a method of processing the signal in digital format so as to extract any information content present $f(t)$ to the precision of digital computing means.

While the radio frequency (RF) range of operation has been mentioned and is an important application for the encoding system, the same principles and equivalent apparatus may be employed for detection and encoding almost anywhere in the frequency spectrum.

Accordingly, it is an object of the present invention to employ servo means instead of open-loop counter means in a frequency input encoding system.

Another object of the present invention is to provide a frequency input system devoid of adjustable inductance-capacitance tuning circuits which resonate to the frequency being encoded.

Another object is to provide a system which relies on phaselock loop methods as the servo means.

Another object is to provide a system whose phaselock loop methods employ an incrementally controlled or digitally-controlled oscillator as the local oscillator instead of the known analog or voltage-controlled oscillator.

Another object is to provide a system whose digitally-controlled oscillator provides synchronizing pulses to ensure phase continuous frequency switching of its input signal.

Another object is to provide a system whose input means is frequency receiving and whose output means delivers a digital approximation of said input signal frequency.

Another object is to provide a system which can encode in real-time input signals for Doppler frequency detection, frequency modulation detection, frequency shift detection, and incidental modulation detection, but is not limited thereto.

Another object is to provide a system whose output is compatible with digital computer input and processing means.

Another object is to provide a system whose data output format is acceptable for demodulation, spectral analysis, and signal processing to digital computing means.

A yet further object is to provide a system whose output is compatible with digital links.

Figure 2:
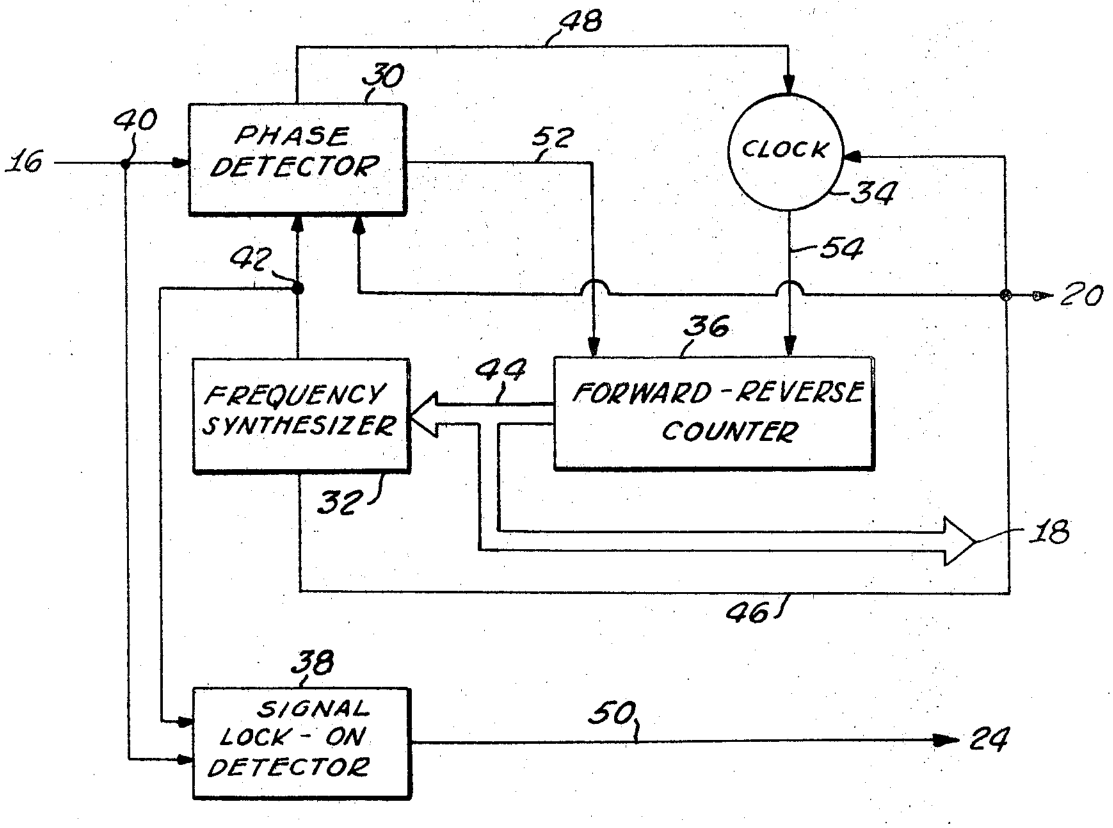
Figure 3:
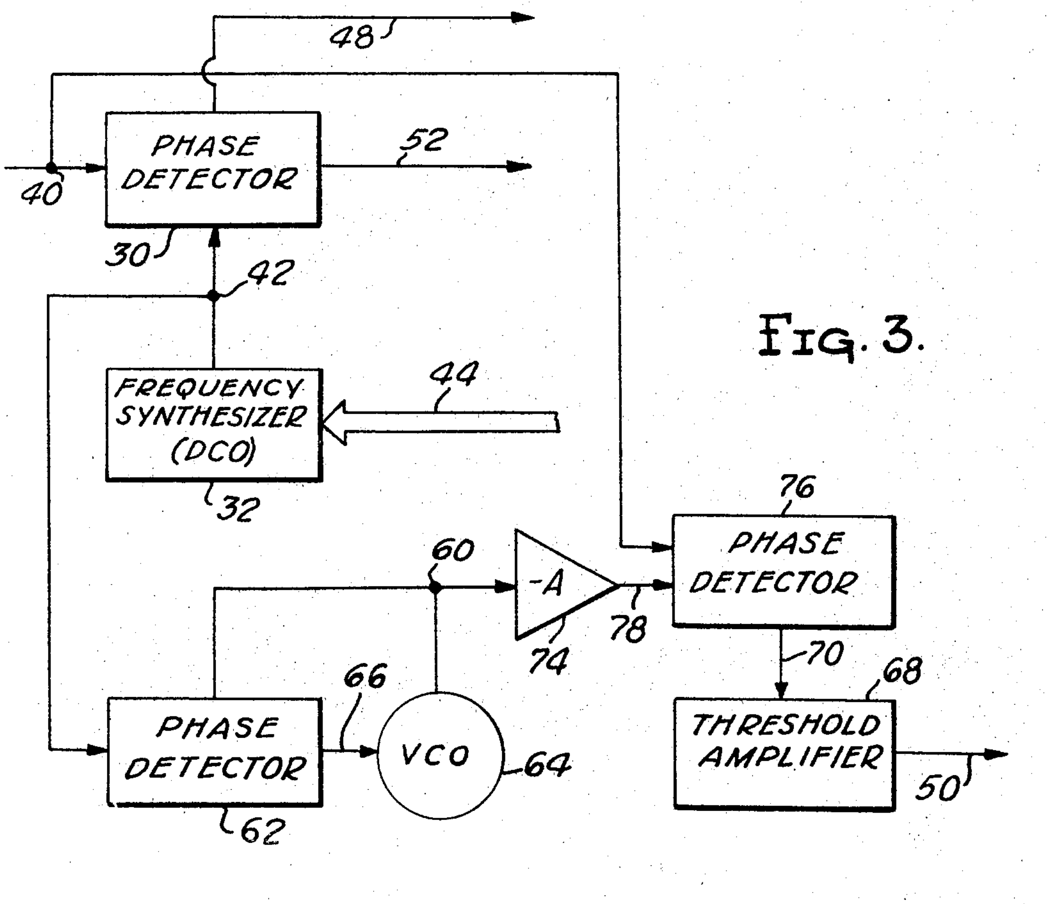
Figure 4:
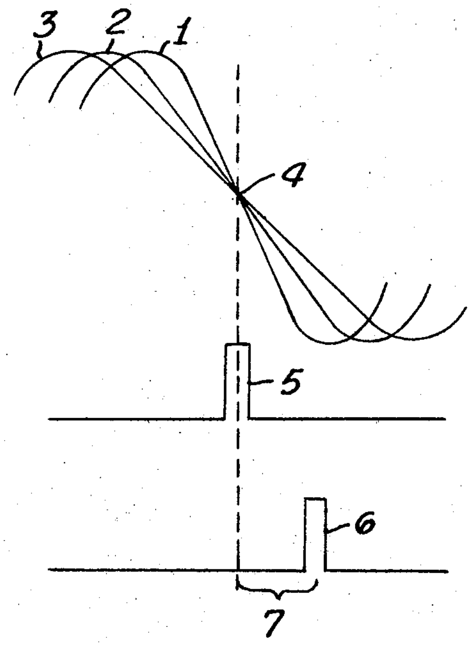
Figure 5:
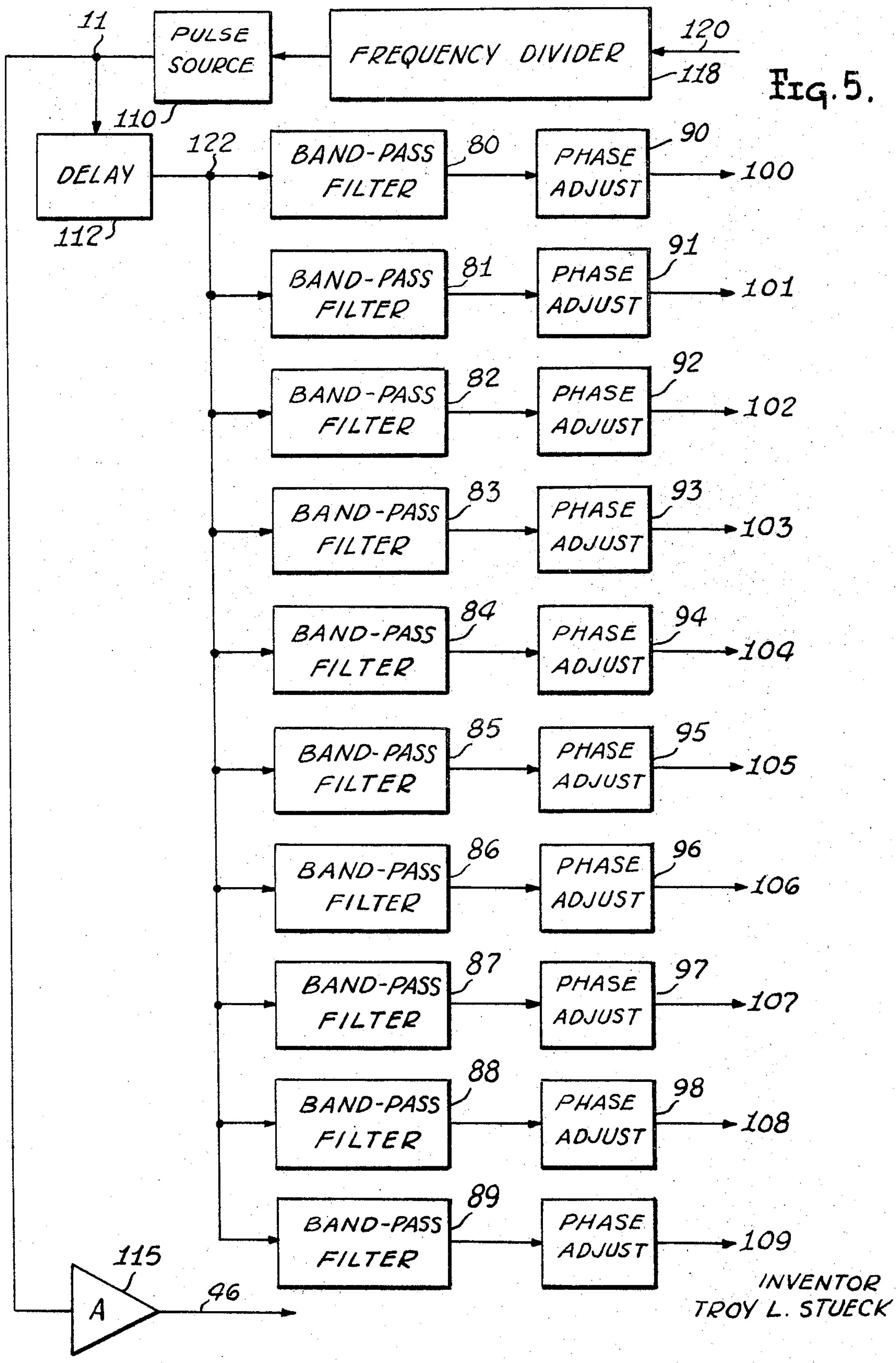
Figure 6:
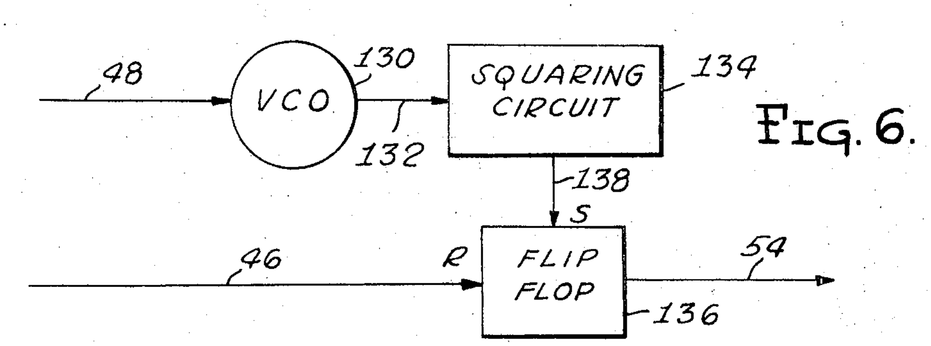
Figure 7:
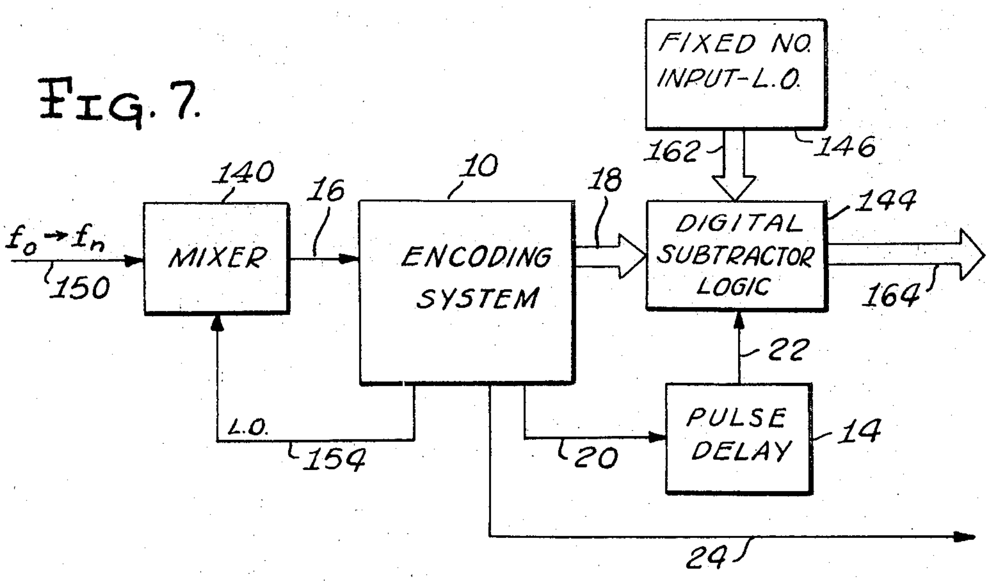
Figure 8:
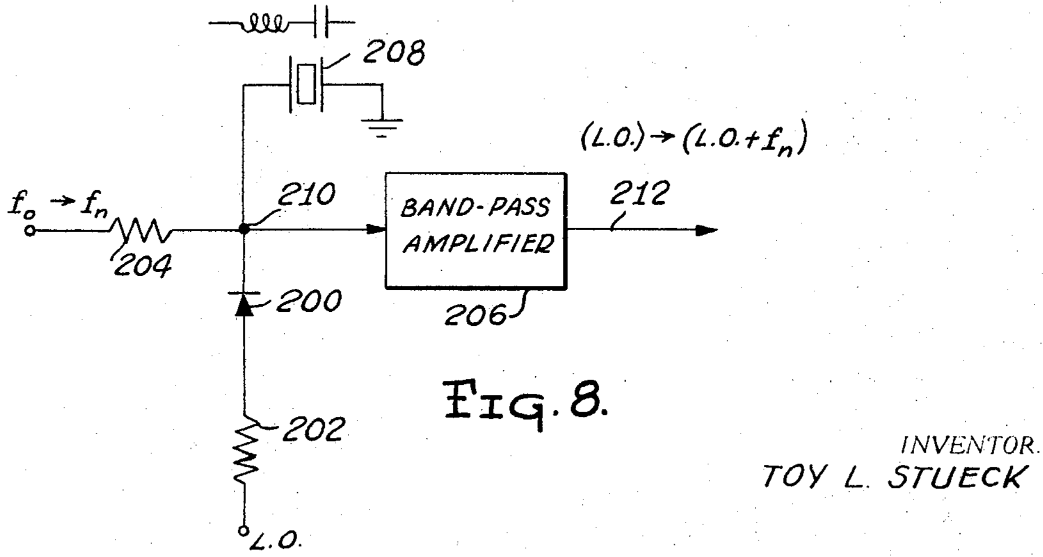

Other objects and advantages of the invention will become apparent from the following description, taken in conjunction with the accompanying drawings in which FIG. 1 is a block diagram of the encoding system connected in a digital link, FIG. 2 is a block diagram of the digital-controlled oscillator, forward-reverse counter logic, counter clock with phase equality pulse synchronization, phase detector coactive with the counter control logic, and signal lock-on detector, FIG. 3 is a block diagram of the signal lock-on detector (of FIG. 2), FIG. 4 is an illustration of phase equality among three different A-C frequencies with a pulse being generated during and after the period of phase equality, FIG. 5 is a block diagram of one method of generating periods of phase equality among ten contiguous frequencies, FIG. 6 is a block diagram showing one method of synchronizing the output pulse from the counter clock with the phase equality pulse, FIG. 7 shows an up-converting means for low frequency signal encoding with a corrected digital readout that is timed out of phase with the system synchronizing pulses, FIG. 8 is a schematic diagram of a series resonant crystal-controlled up converter type of mixer (of FIG. 7).

In FIG. 1 numeral 10 indicates an encoding system having at least one input 16 and three distinct outputs 18, 20, 24. For the illustrative example herein considered of a system connected in a digital link, the outputs are shown coupled directly into a digital computer 12. It is required to show methods of utilizing data output from the system 10.

The variable frequency signal is received at the input 16 where it is operated on by servo means internal to the system so as to encode a digital representation of said input signal at the digital output 18 of the system 10 where it is applied to the digital data input of the computer 12. This connection illustrates how a computer can be so coupled as to operate on the input data in real-time.

Logically, it is necessary to indicate to the computer 12 when the servo means is locked in a closed loop and is tracking. This indication is provided by the phaselock indicating signal output 24 which is connected into the computing means 12. Since the encoding system 10 is a synchronous system, it is necessary to provide pulses to the computer which permit the two systems 10, 12 to be mutually synchronous or timed. The presence of a pulse on the synchronizing output 20 indicates that the digital output signal 18 is in the process of discreetly changing to a new number such that by delaying the synch pulse with pulse delaying means 14, it can be coupled 22 as a data readout pulse to the computer 12. This delaying means 14 insures that the data output 18 can not be readout while it is changing and permits computer operations to interlace with the operations of the encoding system.

It should also be appreciated that while no coupling of command-control lines are shown from the computer 12 to the encoding system 10, there may be applications where control signals would be required to limit or enhance a particular use of the encoding system.

Turning now to the block diagram of the encoding system; as shown in FIG. 2, numeral 32 represents the digitally-controlled oscillator (DCO) having a synch pulse output 46, a discreetly variable frequency output 42, and a digital control input 44 which sets the frequency at which the DCO is to operate. In the loop, it is seen that the phase of the signal from the frequency variable output 42 of the DCO 32 is compared with the phase of the signal at the input 40 in the phase detector whose first output 52 is connected through coupling means to the forward-reverse gate of the counter 36 which provides digital frequency selection signals 44 to the input of the DCO 32. The clock 34 provides a source means of count pulses connected through coupling means 54 to a counter 36 input so that the counter can either advance or subtract in count with each count pulse depending on whether it is gated in the forward-mode or the reverse-mode when a pulse is received. The loop is preferably connected so that when the counter 36 advances in count, the DCO 32 output 42 increases in frequency, and when the counter 36 substracts in count, the DCO 32 output 42 decreases in frequency so that it is discreetly swept up and down in frequency.

Since the presence of a pulse from the DCO 32 indicates an acceptable time for phase continuous switching of its frequency output 42, coupling means 46 are provided for said pulse to insure that the system clock 34 is synchronized with it and will provide a count pulse to the counter 36 only during this time interval through the connecting means 54. Naturally, it is also desirable to inhibit the output 52 of the phase detector 30 with the synch pulse input 46 to insure that the forward-reverse gate is not changing at the same time when the counter clock 34 is advancing or subtracting the count of the counter 36. The synch pulse is also provided as an output signal 46 from the encoding system to permit the synchronizing of external equipment with it.

Another desirable output signal from the system is in an indication of when it is locked to and tracking an input signal 40 which is the function of the signal correlator 38. An output 50 of one level would indicate signal presence at the input 40 and that said signal is being tracked by the system, and one of reversed level would indicate absence of a signal at the input 40 or that the system is not yet locked onto a signal which might be present.

Referring now to FIG. 3, numeral 76 indicates a phase detector having at least two inputs 40, 78 and one output 70 whose signal is smoothed or averaged. It is appreciated that if two signals at the input of a phase detector are either in phase or out of phase, the output signal will be of such an amplitude and sign to so indicate; however, if the two signals are either of different frequency or if one signal is absent, the output of the phase detector is either a beat frequency difference or zero amplitude.

To continue, normal operation of the system (of FIG. 2) requires that when the output 42 of the DCO 32 is locked to the input signal 40 by phase detecting servo means, the phase relationship between the signal input 40 and the DCO 32 output 42 will be ninety (90) degrees. By locking in phase the output 60 of the VCO 64 with phase detecting means 62 to the output 42 of the DCO 32, it is possible to maintain a phase relationship between the VCO output 60 and the DCO output 42 of ninety (90) degrees such that the phase relationship between the input signal 40 and the VCO output signal 60 are related by one-hundred eighty (180) degrees. The amplifying means 74 is used to invert the signal at the VCO output 60 so that the phase relationship between the signal input 40 and the inverter 74 output 78 is three-hundred sixty (360) degrees which is the same as zero (0) degrees when the encoding system (of FIG. 2) is locked to and tracking the signal input 40. Under the above conditions of zero (0) degrees phase relationship between the two inputs 40, 78 of the synchronous detector 76, the output will indicate correlation of the two input signals such that the threshold amplifier 68 will change to the appropriate state and so indicate with an appropriate signal level at its output 50.

FIG. 4 and FIG. 5 are related in that FIG. 4 represents the accomplishment of the means of FIG. 5 and should be viewed together. FIG. 4 illustrates the various waveforms that are generated internal to the circuitry of FIG. 5. For instance, the sinusoidal waveforms 1, 2, 3 represent respectively three 100, 101, 102 of the ten comb-generator frequency (TCGF) outputs 100, 101, 102, 103, 104, 105, 106, 107 108, 109. It can be seen that the three sinusoidal waveforms 1, 2, 3, representing three distinct frequencies, all cross through the common point 4 which represents the moment of phase equality occurring among the three frequencies. In time with this moment of phase equality 4 is generated a pulse 5 which can be used in synchronizing the system for all operations that must occur at this time.

In FIG. 5 is illustrated in block diagram form the means of generating the waveforms of FIG. 4 whereby the synchronizing pulse 5 is generated by the pulse source 110 which is derived from a standard frequency source 120 through the frequency divider means 118. The synchronizing pulse 5 is characterized by rich harmonic content and precision stable rate of occurrence and is coupled 114 through a pulse delay circuit 112 to the inputs 122 of a set of contiguous filters 80, 81, 82, 83, 84, 85, 86, 87, 88, 89, which are caused to ring at their characteristic resonant frequencies which are tuned to the desired harmonics of the synchronizing pulse 5. Their respective outputs are phase adjusted 90, 91, 92, 93, 94, 95, 96, 97, 98, 99 to effect phase equality each time a pulse 5 occurs at the output 114 of the pulse source means 110.

It is interesting to note the relationship of the output frequencies 100, 101, 102, . . . , 109 from the TCGF with respect to the pulse rate frequency PRF of the synchronizing pulse 114. Briefly, it can be shown that $$f_{10m}=(M+m)\times(PRF)$$

where $f_{10m}$ represents any one of the ten frequencies from the TCGF as $m$ can assume any integer from 0 through 9 and M is a fixed integer of some harmonic multiple determined for a specific TCGF system design.

As an example, let the PRF=100 kHz., M=30, and $m$=0, 1, 2, . . . , 9, then $$f_{100}=3.0 \text{ mHz.}$$
$$f_{101}=3.1 \text{ mHz.}$$
$$f_{102}=3.2 \text{ mHz.}$$
$$\cdot \quad \cdot \quad \cdot \quad \cdot \quad \cdot$$
$$f_{109}=3.9 \text{ mHz.}$$

which represents one specific design for means of generating synchronizing pulses during periods of phase equality. It is, of course, appreciated that the band-pass filters are respectively designed with their center frequencies set at the above frequencies for the present exemplary design.

One application for the synchronizing pulse is illustrated in FIG. 6 where one clock means 34 (of FIG. 2) is schematically represented so as to show a method of obtaining clock pulses 54 which occur only during the presence of said synch pulse 46. Basically, a VCO 130 which is controlled by a signal 48 from the phase detector 30 which is some function of the absolute phase error signal amplitude provides a pulse source 134 of signals such that they are connected through coupling means 138 to the set input of a flip-flop 136. Each cycle of output from the VCO 130 is then used to activate the flip-flop 136 in a set-mode unless the flip-flop is already in the set-mode when a VCO 130 source pulse is applied. If the flip-flop 136 is already in the set-mode when a VCO 130 source pulse is applied, it 136 will merely maintain that set-mode. Upon the receipt, however, of a synch pulse 46, the flip-flop 136 will be reset to the reset-mode whereby it 136 will remain pending the receipt of the next VCO 130 source pulse. If the flip-flop 136 is in the reset-mode when a synch pulse 46 is applied, it 136 will merely maintain that reset-mode.

The output means 54 of the flip-flop 136 is so designed that an output signal clock pulse 54 is supplied only during the resetting of the flip-flop 136. Since the synch pulse 46 performs the reset operation, the output clock pulse 54 is always timed in synchronism with it 46. This synchronism assures that the clock pulse 54 to the counter means 36 (of FIG. 2) provides synchronzied counter output 44 changes for phase continuous switching of the DCO 32.

Consider now the application of the encoding system 10 (of FIG. 7) wherein it is desired to encode low frequency signals 150 of the audio range from about 0 Hz. to 100 kHz. In order to design the loop components of the encoding system 10 so that they are relatively unaffected by the large dynamic range of input frequencies 150 which result from the audio range of input signals, it is necessary to up-convert 140 these audio signals 150 from a range of $f_0$ to $f_n$ up to a range of $(LO+f_0)$ to $(LO+f_n)$ 16. The up-converted frequencies 140 are then connected through coupling means 16 to the encoding system 10 which is caused to lock on and track those signals over a range from $(LO+f_0)$ to $(LO+f_n)$ and provide a digital representation of the input signal 16 at its output 18.

It is appreciated that the readout from the output 18 will be a digital representation of the input signal 150 shifted by a fixed amount LO to a higher number. In order to provide a corrected output signal 164 whose digital range covers from $f_0$ to $f_n$, a fixed digital number equal to the LO 146 must be digitally subtracted 144 from the digital representation 18.

The local oscillator frequency LO 154 is shown being derived from the encoding system but need not be as long as it is a stable precision oscillator source.

The synch pulse output 20 is coupled through a pulse delay 14 such that a readout sample pulse 22 is provided to the digital subtractor logic 144 which is timed to occur during a time period when the output signal 18 cannot change its digital number. Numeral 24 represents the signal output line which indicates when the encoding system 10 is locked to and tracking an input signal 16.

While the digital subtractor 144 provides one means for correcting the readout signal 18 from the up-converter encoding system, other means are applicable. Suffice it to say (ref. FIG. 2) that the wiring 44 between the forward-reverse counter 36 and the DCO 32 could be so arranged that when the counter 36 read zero (0), the output 42 from the DCO 32 was LO Hz., and when the counter 36 output 44 read one (1), the output 42 from the DCO 32 was $LO+1$ Hz., etc.; however, the up-converter mixer 140 (of FIG. 7) is still required.

Referring now to FIG. 8, it is seen one method of up-converter means having two inputs—$f_0$ to $f_n$ and LO—and one output 212 $(LO+f_0)$ to $(LO+f_n)$. The mechanism of operation employs a single diode mixer 200 having coupled to it energy from a precision local oscillator LO through the drive resistor 202 where the LO signal frequency is shorted to ground at the signal terminal 210 by the series resonant crystal 208. In this configuration, it is possible to R-F bias the mixer diode 200 without transferring any of the R-F LO energy to the mixer output 212. The series resonant crystal 208 is resonant at the LO frequency so as to insure that its narrow band characteristic shunt only the LO frequency to ground and not any of its up-converted sidebands.

When a low frequency signal $f_0$ to $f_n$ is applied at the input through resistor 204, its frequency is mixed in the diode 200 with the LO frequency such as to generate sum and difference frequencies of which only the sum frequencies are allowed to pass through the band-pass amplifier 206. The signal at the output 212 would then represent the arithmetic sum of the frequency coupled through resistor 204 and the LO frequency coupled through the resistor 202. When no signal is coupled through resistor 204, there is no signal present at the output 212 of the mixer up-converter. There are, of course, many ways of achieving up-conversion of audio frequencies if so desired and the above represents only one example.

Having thus fully described my invention and the manner in which it is to be practiced, I claim:

What is claimed is:

1. The encoding method of providing a continuous indication, in digital form, of the frequency of an input signal which includes the steps of:
   (a) receiving an input signal whose frequency can vary over a range,
   (b) synthesizing a phase-continuous local frequency which can vary over a range in incremental steps by
      (i) generating a plurality of contiguous comb-frequencies,
      (ii) synchronizing the comb-frequencies to have periods of phase equality,
      (iii) generating timing pulses coincident in time with the phase-equal periods, and
      (iv) selecting and combining the comb-frequencies to synthesize said local frequency,
   (c) comparing the phase of said input frequency and said local frequency,
   (d) generating a clock frequency which can vary over a range,
   (e) adjusting said clock frequency as a result of said comparison,
   (f) gating in coincidence said clock frequency and the timing pulses of said synthesizing method,
   (g) inhibiting a level change resulting from said comparison during time coincidence with the timing pulses,
   (h) counting said clock frequency to produce said incremental steps for selecting and controlling said local frequency,
   (i) adjusting the phase of said local frequency as a result of said comparison by causing said counting to alternate in a predetermined manner between up-counting and down-counting, thereby to phaselock said local frequency to said input frequency, (j) reading out the count at any given incremental step prior to each successive counting change to digitally indicate instantaneously said local frequency which is phaselocked to said input frequency, and (k) coupling out the timing pulses of said synthesizing method, thereby to synchronize digital processes external to said encoding method.

2. In a digital phase lock loop system, apparatus for accepting an input frequency signal and providing a digital output signal representation of said input frequency signal comprising:

(a) frequency synthesizer means having an input and two outputs for providing at said first output a signal frequency which is incrementally dependent on a digital signal representation at said input, and at said second output a train of timing pulses synchronized in time with phase-continuous switching of the signal frequency, (b) phase detector means having at least three inputs and an output, with a first of said inputs accepting said input frequency signal, a second of said inputs accepting the signal frequency of said frequency synthesizer means, and a third of said inputs accepting the timing pulses of said frequency synthesizer means whereby a change in the output level of said phase detector means is inhibited during time coincidence with the timing pulses, (c) forward-reverse counter means, whose output signal is in digital form and is coupled to the input of said frequency synthesizer means, including control input means coupled to the output of said phase detector means for controlling the direction of count, and having signal input means, (d) clock source means providing a clock frequency signal which is gated coincident in time with the timing pulses of said frequency synthesizer means, said clock frequency signal being coupled to the signal input means of said forward-reverse counter means, (e) indicator means coupled to said forward-reverse counter means to provide a continuous indication of the count in said counter, and (f) synch pulse means coupled to the second output of said frequency synthesizer means to provide timing pulses for synchronizing digital systems external to said digital phase lock loop system.

No references cited.

JOHN KOMINSKI, Primary Examiner

U.S. Cl. X.R.

331—16, 17